United States Patent [19]

Kawamura

[11] Patent Number: 4,775,583
[45] Date of Patent: Oct. 4, 1988

[54] COMPOSITE PLASTIC SHADING MEMBER

[75] Inventor: Takashi Kawamura, Shinmachi, Japan

[73] Assignee: Canon Kabushiki Kaisha, Tokyo, Japan

[21] Appl. No.: 801,866

[22] Filed: Nov. 26, 1985

[30] Foreign Application Priority Data

Nov. 29, 1984 [JP] Japan ................................ 59-250402

[51] Int. Cl.$^4$ .............................................. D03D 3/00
[52] U.S. Cl. .................................... 428/294; 354/241; 428/408; 428/457; 428/902; 428/910; 428/232
[58] Field of Search ............... 428/294, 295, 284, 285, 428/286, 287, 408, 902, 910, 919, 457, 232; 354/241

[56] References Cited

U.S. PATENT DOCUMENTS

| 4,211,818 | 7/1980 | Ackley | 428/288 |
| 4,604,319 | 8/1986 | Evans et al. | 428/294 |
| 4,614,678 | 9/1986 | Gango | 428/294 |

FOREIGN PATENT DOCUMENTS 141625 9/1982 Japan.
618271 4/1984 Japan.

Primary Examiner—James J. Bell
Attorney, Agent, or Firm—Fitzpatrick, Cella, Harper & Scinto

[57] ABSTRACT

A composite plastic shading member comprises a substrate layer comprising continuous fiber fluxes arranged in one direction reinforced with a matrix resin and a heat-shrinking plastic film overlying at least one surface of the substrate layer.

16 Claims, 3 Drawing Sheets

COMPOSITE PLASTIC SHADING MEMBER

BACKGROUND OF THE INVENTION

1. Field of the Invention

This invention relates to a composite plastic shading member which may be used for a curtain for camera shutters and the like.

2. Description of the Prior Art

Heretofore, there have been proposed plastic curtains for shading members of light weight and high rigidity for use as high speed electromagnetic driving shutters in cameras. For example, Japanese Patent Application Laid-open No. 141625/1982 discloses a shutter curtain constituted of a sheet composed of a plastic material filled with a reinforcing material such as glass cloth, carbon fiber, polyester fiber, asbestos, paper and the like, the surface of the sheet being covered with an organic coating film having a lubricating property. In addition, Japanese Patent Application Laid-open No. 61827/1984 discloses a shading curtain having a hollow portion and surface layers at least one of which is formed by using a resin reinforced with carbon fibers (by way of prepreg sheet).

However, in the case of the former shutter curtain, the type and amount of the filling material are limited and it is difficult to disperse uniformly the filling material and therefore, it is difficult to obtain a curtain of thin thickness, light weight and high rigidity. Further, in the case of the latter curtain, it requires much labor to fabricate a composite member having a hollow portion by using a prepreg laminate sheet of a continuous carbon fiber, and therefore, from an industrial point of view, the productivity and cost are disadvantageous. On the contrary, it is a simple method for producing a curtain to use a prepreg laminate sheet of carbon fiber alone. However, upon fabrication of the prepreg, a carbon fiber flux is loosened as much as possible and carbon fibers are arranged in one direction to obtain a thin prepreg impregnated with a half-cured resin. However, when the thickness is made as thin as about 50–60 $\mu$m, the gap between fiber fluxes deviates. In particular, the fiber fluxes get out of position due to lowered viscosity of resin when the prepreg is heated and cured under pressure. Therefore, it is difficult to keep the bending rigidity uniform and the sheet-like shaped article after being cured is liable to be torn in the arranged direction, and therefore, it is difficult to use the carbon fiber reinforced resin sheet alone as a shading member moving at a high speed.

SUMMARY OF THE INVENTION

An object of the present invention is to provide a composite plastic shading member which has good flatness and, in addition, is of light weight and high rigidity.

Another object of the present invention is to provide a composite plastic shading member capable of being fabricated at a high productivity by simple steps.

According to the present invention, there is provided a composite plastic shading member which comprises a substrate layer comprising continuous fiber fluxes arranged in one direction reinforced with a matrix resin, and a heat-shrinking plastic film overlying at least one surface of the substrate layer.

DESCRIPTION OF THE PREFERRED EMBODIMENTS

The composite plastic shading member of the present invention is constituted of a fiber flux sheet reinforced with a matrix resing and a heat-shrinking plastic film overlying at least one of the fiber flux surfaces. The fiber fluxes are arranged in one direction and buried in a matrix resin and the fiber fluxes themselves are constituted of bundled continuous fibers. As the continuous fibers constituting the fiber fluxes, there may be used inorganic fibers or organic high polymer fibers. As the matrix resin, there may be used thermoplastic resins or thermosetting resins.

Figure 1A:
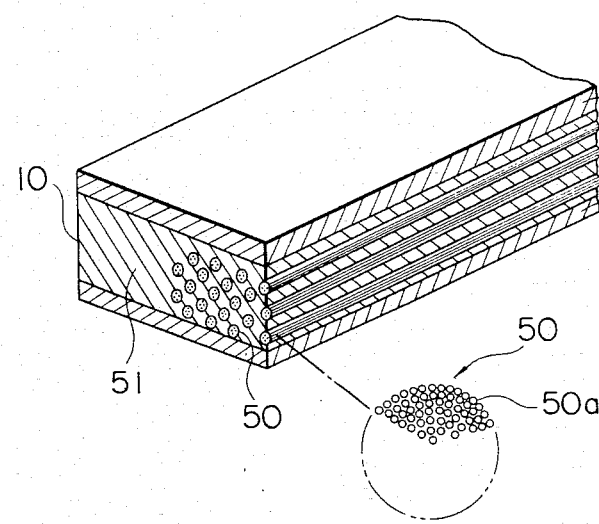
FIG. 1A is a partial oblique view of a fundamental structure of a composite plastic shading member according to the present invention.
Figure 1B:
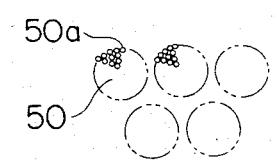
FIG. 1B is a cross sectional view of the shading member in FIG. 1A.

Referring to FIG. 1A, the composite plastic shading member is explained. A sheet-like substrate layer 10 is constituted of a matrix resin 51 and continuous fiber fluxes 50 arranged in one direction buried in matrix resin 51. In FIG. 1A, fiber fluxes 50 are shown such that they are sparsely placed for easy understanding, but fiber fluxes 50 are practically placed densely as illustrated in FIG. 1B.

A fiber flux 50 is composed of bundled continuous fiber 50a. As the continuous fiber 50a, there may be used inorganic fibers or organic high polymer fiber. The inorganic fibers include, for example, carbon fibers, alumina fibers, and silicon carbide fibers. More preferable inorganic fiber is a carbon fiber of high strength (specific modulus of tensile elasticity = modulus of tensile elasticity/density, $13 \times 10^8$ cm or more) or of high modulus of elasticity (specific modulus of tensile elasticity, $22 \times 10^8$ cm or more). Such carbon fibers are, for example, those of high strength and high modulus of elasticity which are produced by baking polyacrylonitrile filament yarn to obtain continuous fibers of monofilament of 6.5–8 $\mu$m in dia, and bundling 1000–3000 of the resulting continuous fibers by using, for example, a binder to form fiber flux.

As the organic high polymer fibers, there may be used, for example, aromatic polyamide fibers and aromatic polyester fibers of high strength and light weight. In addition, as the continuous fibers, there may be preferably used hybrid fibers of inorganic fiber and organic high polymer fiber. For example, a hybrid fiber of carbon fiber and aromatic polyamide fiber may be used.

One of the preferred embodiments of the present invention is that the tows of the above-mentioned continuous fibers of high strength and high modulus of elasticity are arranged in one direction and are impregnated with a matrix resin under tension by a conventional method to form a sheet-like laminate.

As the matix resin 51, there may be used thermosetting resins or solvent-soluble thermoplastic resins. The thermoplastic resin includes, for example, polycarbonate, polysulfon, polyether sulfon, polyether etherketone, polyether imide, polystyrene, polyamide, polymethyl methacrylate, polyethylene, polypropylene, and modified ones of the above-mentioned resins.

As the solvent, there may be used any conventional solvents capable of producing a solution of each of the resins of a desired concentration. For example, there may be used chlorinated hydrocarbons such as methylene chloride, trichloroethane, tetrachloroethylene and the like and cyclohexane for polycarbonate, and the above-mentioned chlorinated hydrocarbons and ketones such as acetone, methyl ethyl ketone and the like for polyether sulfon.

On the other hand, as the thermosetting resins, there may be used, for example, epoxy resins, unsaturated polyester resins, vinyl ester (epoxyacrylate) resins, phenolic resins, diallylphthalate resins, polyaminobismaleide resins, bismaleide triazine resins and the like, modified ones of the above-mentioned resins, mixture of the resins, and the prepolymers.

If desired, the thermosetting resing component may contain solvents, diluents, curing agents, pigments, dyes, inorganic or organic fillers, and the like.

Substrate layer 10 has a heat-shrinking plastic film 11 overlying at least one surface thereof. Laminating heat-shrinking plastic film 11 on substrate layer 10 can suppress the deviation of fibers due to lowered viscosity of the resin upon heating and shaping under pressure and simultaneously improve tear strength with respect to the direction of arrangement of fibers.

Heat-shrinking plastic film 11 can be laminated on substrate layer 10, for example, by placing the substrate layer between a pair of molding plates and heating and pressing.

In case the adhesion between substrate layer 10 and heat-shrinking plastic film 11 is poor, it is preferable to preliminarily activate the surface of the plastic film by corona discharging treatment, flame treatment, chemical treatment or the like, or to apply an undercoat agent to the surface of the plastic film. For example, it is suitable for the above-mentioned biaxially stretched polyester film to apply a corona discharging treatment to said film so as to enhance the surface wet tension to about 37 dyne/cm. Or, as the undercoat agent, polyester resins, epoxy resins, polyester-melamine resins, polyurethane resins, alkyl titanate or the like mixed with solvents, diluents, curing agents or the like may be coated and dried.

Substrate layer 10 can be produced, for example, by arranging, in one direction, continuous fiber fluxes drawn out from a plurality of bobbins, continuously impregnating the fiber fluxes with a matrix resin solution by means of a drum winder type impregnating apparatus, winding the continuous fiber fluxes thus impregnated in parallel on a drum around which a releasing paper treated with silicone is wound, to prepare so-called A-stage, that is, remaining impregnated with the resin solution without squeezing the content of the resin solution, or so-called B-stage (prepreg), that is, half-cured by heating after impregnation, and cutting the sheet thus wound into a desired size to obtain the substrate layer 10.

The content of the matrix resin in the substrate layer is preferably 10–90% by weight, more preferably, 30–50% by weight.

The thickness of the substrate layer is preferably 30–100 μm, more preferably, 50–80 μm.

As the heat-shrinking plastics laminated on at least one surface of the substrate layer, there may be used, for example, crystalline resin films such as polyethylene, polypropylene, nylon, polyesters and the like and non-crystalline resin films such as polystyrene, polyvinyl chloride, polyvinylidene chloride, fluorocarbon resins, polycarbonate, polysulfon, polyvinyl alcohol, polyether imide, polyether sulfon, and the like. Among these plastics, as the crystalline resin, polypropylene and polyesters are preferable, and as the non-crystalline resin, polystyrene, polycarbonate, polysulfon, polyether imide, and polyether sulfon are preferable.

As the plastic film, the plastic film subjected to a mechanical orientation treatment (i.e. stretching) is preferable. In particular, the plastic film subjected to a biaxial stretching with different stretching ratios in length and width. The stretching can be conducted by a conventional method and condition, for example, by a successive biaxial stretching according to Tenter method, or a simultaneous biaxial stretching according to tubular method.

Characteristics of the plastic film mechanically oriented, for example, biaxially stretched polyester film are preferably as shown below.

| | |
|---|---|
| Density: | 1.38–1.42 g/cm$^3$ |
| Melting point: | 255–270° C. |
| Tensile modulus of elasticity: | 380–450 kg/mm$^2$ |
| Heat-shrinking rate; | |
| in length (longitudinal direction): | 0.8–1.7% |
| in width (perpendicular to the longitudinal direction): | 0.2–1.2% |

Upon laminating a heat-shrinking plastic film on a substrate layer, it is preferable to set the longitudinal direction (the direction of the large heat-shrinking rate) of the heat-shrinking plastic film in the direction perpendicular to the direction of arranging the fibers of the substrate layer. By setting the heat-shrinking plastic film as mentioned above, warp of the shading member can be prevented.

The thickness of the biaxially stretched plastic film is preferably 6–20 μm, most preferably 6–15 μm.

At least one surface of the heat-shrinking plastic film 11 used in the present invention may be coated with a metal thin film to improve the shading and flatness. Coating with a metal thin film can be effected by, for example, conventional vacuum vapor deposition, and the metal to be vapor-deposited includes metals in groups I–VIII of the Periodic Table, such as Al, T, Cr, Ni, Cu, Zn, Ag, Au and the like, and Al and Ti are preferable.

When the adhesion between the heat-shrinking plastic film and the metal thin film is poor, the surface of the plastic film may be preliminarily subjected to an activating treatment by applying corona discharging treatment, flame treatment, chemical treatment or the like, or is coated with an undercoat agent.

For example, it is advisable to apply a corona discharging treatment to the above-mentioned biaxially stretched polyester film to enhance the surface wet tension to about 37 dyne/cm, or to apply a mixture of polyester resin, epoxy resin, polyester-melamine resin, polyurethane resin, alkyl titanate or the like and solvent, diluent and curing agent as an undercoat agent to the surface and dry.

Further, to the surface of the plastic film having the metal thin film may be applied a black ink having rubbing resistance, abrasion resistance and heat resistance. The black ink is applied to at least one side of the plastic film. A black ink prepared by mixing vehicle resin, solvent, diluent, curing agent and black pigment (for example, conventional carbon black) may be used. The vehicle resin includes polyester resin, a mixture of nitrocellulose and maleic acid resin, acrylic resin, vinyl chloride/vinyl acetate copolymer, polyurethane resin, and a mixture of polyurethane and a vinyl chloride/vinyl acetate copolymer. To the black ink may be added usually used additives such as waxes, higher fatty acid amides, chelating agents, coupling agents, curing agents and the like.

The black ink may be applied to the surface all over by using a coating device such as bar coater, roll coater, gravure coater and the like. In addition, the black ink is applied to at least one surface of the above-mentioned plastic film without coating of the metal thin film so as to improve shading characteristic, reflection prevention, appearance and the like.

The black ink used here may be that having the above-mentioned composition. When the adhesion between the black ink and the heat-shrinking plastic film is poor, the above-mentioned surface treatment or application of the undercoat agent can sufficiently solve the problem.

The thickness of the metal thin film is preferably 0.3–1.0 μm. When the thickness is thinner than 0.3 μm, pinholes are liable to form and when the thickness exceeds 1.0 μm, the performance does not change, but the resulting weight and cost are not preferred ones.

The thickness of the black ink is preferably 3–10 μm. At the thickness less than 3 μm, the appearance is poor and at the thickness exceeding 10 μm, the performance does not vary, but the resulting weight and cost are not good.

The thickness of the undercoat agent which is applied, if desired, can be sufficiently as thin as not thicker 1.0 μm.

The thickness of the plastic film thus treated is preferably 10–25 μm.

In case that the composite plastic shading member according to the present invention is used for shutter curtains, the total thickness of the shading member is preferably 40–150 μm, practically most preferably 40–100 μm. When it is thinner than 40 μm, the deviation of fibers arranged in one direction is controlled with difficulty so that the curtain material is not desirable in view of the above-mentioned characteristics.

Since conventional longitudinally moving focal plane shutter curtain is constituted of one set of leading curtain and trailing curtain, each of which is constituted of 3–4 sheets of curtains, the thickness exceeding 150 μm adversely affects thin thickness and light weight.

Referring to FIGS. 3–6, other embodiments of the present invention are described below.

Figure 3:
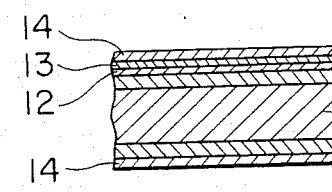

In FIG. 3, a heat-shrinking plastic film 11 is laminated on both surfaces of a substrate layer 10, and further, at one side of the substrate layer, an undercoat agent 12, a metal vapor-deposited film 13 and a black ink 14 are laminated in succession on the heat-shrinking plastic film 11. At the other side, a black ink 14 is directly coated on the heat-shrinking plastic film.

Figure 4:
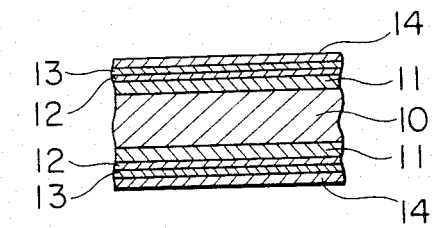

In FIG. 4, on both sides of a substrate layer 10 are laminated in succession a heat-shrinking plastic film 11, an undercoat agent 12, a metal vapor-deposited film 13 and a black ink 14.

Figure 5:
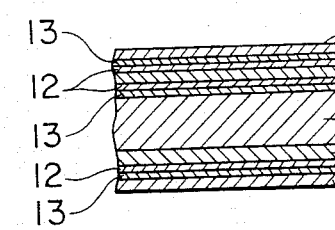
Figure 6:
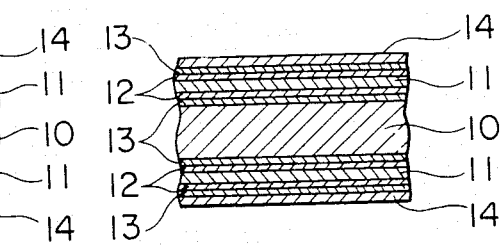

In FIGS. 5 and 6, an undercoat agent 12 and a metal vapor-deposited film 13 are sandwiched between a heat-shrinking plastic film 11 and a substrate layer 10. In FIG. 6, they are sandwiched at the both sides of the substrate layer 10 while in FIG. 6, they are sandwiched at only one side of the substrate layer 10.

As described above, the composite plastic shading member having the above-mentioned structure according to the present invention can improve the mechanical strength and flatness, and in addition, can attain a thin thickness and light weight.

Further, the composite plastic shading member can be effeciently produced by simple steps.

The composite plastic shading member according to the present invention can be effectively used as high speed shutter curtains.

The present invention is illustrated in the following Examples 1–12. The evaluation methods employed in the following examples are as shown below.

Figure 7:
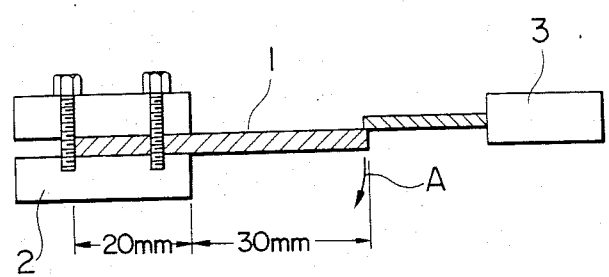
FIG. 7 is a plan view of an apparatus for measuring rigidity (bending strength) of a shading member.

(1) Rigidity (Bending strength):

A plan view of the measuring apparatus is shown in FIG. 7. One end (20 mm long) of a composite plastic sheet 1 cut in a shape similar to a shutter curtain (10 mm wide and 50 mm long) is clamped with a clamper 2. The cantilever composite plastic sheet 1 of 30 mm long thus fixed is bent in the direction of arrow A by 5 mm and the resulting repulsion force was measured by means of a stress measuring device 3 (CORREX meter, manufactured by HAAG-STREIT AG., Switzerland).

Measuring was made with respect to both the fiber arranging direction of the substrate layer and the direction perpendicular to the fiber arranging direction.

Figure 8:
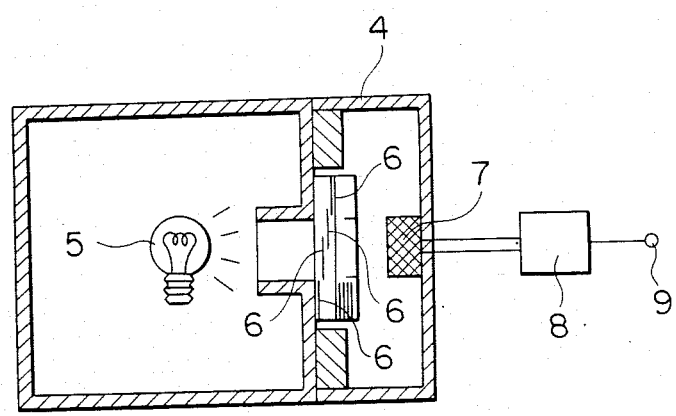
FIG. 8 is a plane view of an apparatus for testing light leaks for measuring the shading degree.

(2) Shading characteristic:

FIG. 8 shows a light leak testing apparatus fabricated for evaluating the shading characteristic. In a camera obscura 4, a light source 5 (halogen lamp), a member to be measured 6, and a light receiving element 7 (silicon photocell) are successively arranged, and a signal from the light receiving member 7 was displayed and recorded through an amplifier 8 as an output 9. Three pieces of the light receiving element 7 of 35 mm in size were set and light leak in the plane of the member to be measured 6 was measured.

When there is not any light leak, that is, it is completely dark, the output of the light receiving element was 2.34 V. When the output is less than this value, there is light leak. In the evaluation according to the present invention, one laminated composite plastic sheet in place of a shutter curtain was fixed to an aperture to evaluate the light leak.

(3) Flatness (or warp):

On a glass base plate of roughness of not more than 0.005 is placed a composite plastic sheet of 10 mm wide and 50 mm long, and the maximum warp from the surface of the glass base plate is measured by a reading microscope.

EXAMPLES 1–5 and COMPARATIVE EXAMPLE 1

There was prepared a matrix resin solution composed of 140 parts of Bisphenol A.epichlorohydrine type epoxy resin (EPICLON 1051-75M; a methyl ethyl ketone solution containing 75% by weight of the solid matter, produced by Dainihon Ink Kagaku Kogyo K.K.), 4 parts of a curing agent, dicyanamide (DICY), 0.3 part of a curing accelerating agent, dimethylbenzylamine (DMBA), 25 parts of acetone, and 30 parts of methylcellosolve.

Tows constituted of 1000 carbon fiber filaments having a monofilament diameter of 6.5 μm (TORAYCA T300, tradename, produced by Toray Co., high strength thread, specific modulus of tensile elasticity of $14 \times 10^8$ cm, density of 1.76 g/cm$^3$) were arranged in one direction. The resulting fiber fluxes were impregnated continuously with the above-mentioned matrix resin solution by using a drum winder type impregnating apparatus and wound in parallel around a drum around which a silicone treated releasing paper was wound, and a substrate layer containing about 40% by weight of the resin and of 55 μm thick in B-stage state (prepreg) was prepared and cut into 100 mm square pieces.

Figure 2:
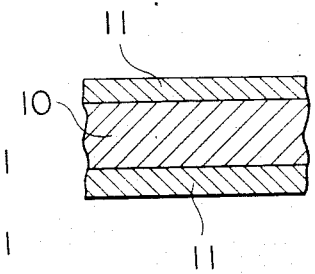
FIGS. 2–6 are schematical cross sectional views of various embodiments of the composite plastic shading member according to the present invention.

Then, using pellets of polyester resin produced by polycondensation of terephthalic acid and ethylene glycol, there was shaped a cast sheet, which was then stretched in length and in width with stretching ratio varying from 0 to 4.5 times to produce successive biaxially stretched polyester films of 10–11 μm thick having different heat-shrinking rate. Then, one surface of the resulting film was subjected to corona discharging treatment to impart a surface wet tension of 37 dyne/cm, and cut into a size of 120 mm square. The longitudinal direction (a direction in which the heat-shrinking rate is large) of the polyester film is set in perpendicular to the direction of arranging the prepreg fibers and the treated surface of the film was placed to face inside. Then, the film was placed on both surfaces of the substrate layer, and the resulting layered plate was inserted between a pair of aluminum mold plates having roughness of not more than 0.05 and degree of parallelism of not more than 0.05. The mold plates were inserted between heating plates of an oil press, preheated at 120° C. for 20 min. without pressing, and then shaped at 140° C. at 7 kg/cm$^2$ for one hour. Then, the electric source for the heating plates was turned off to cool to room temperature and the resulting shading member of the present invention was taken out. The structure of the shading member is shown in FIG. 2. Polyester film 11 is laminated on both sides of the substrate layer 10 composed of a carbon fiber reinforced epoxy resin.

Each of the shading members according to the present invention thus produced was measured as to heat-shrinking rate, shading characteristic, and tear strength and the results were evaluated. In addition, a shading member having a substrate layer only in the same manner as above. The results are shown in Table 1. It is clear from Table 1 that, upon laminating and curing a thin prepreg, the deviation of fibers can be prevented to a considerable extent by utilizing the heat-shrinking property of the plastic film. Further, it is also clear that the tear strength as to the direction of arranging fibers can be markedly improved.

TABLE 1

| | Materials Constituting laminate sheet[1] | Total thickness after curing (μm) | Heat-shrinking film thickness[4] x̄/R (μm) | Heat shrinking rate[2] length/width (%) | Output of shading light receiving element (V) | Tear strength[3] (Kg/mm) |
| --- | --- | --- | --- | --- | --- | --- |
| Comparison Example 1 | CF-Epoxy resin | 50 | none | — | 1.172–1.523 | 0.5–1.5 |
| Example 1 | PET/CF-Epoxy resin/PET | 70 | 10/2 | 0.2/0.1 | 1.335–1.550 | 13–18 |
| Example 2 | PET/CF-Epoxy resin/PET | 70 | 10/3 | 0.4/0.2 | 1.450–1.753 | 10–17 |
| Example 3 | PET/CF-Epoxy resin/PET | 72 | 11/2 | 0.8/0.2 | 1.925–2.010 | 10–17 |
| Example 4 | PET/CF-Epoxy resin/PET | 70 | 10/4 | 1.2/0.5 | 1.985–2.154 | 9–16 |
| Example 5 | PET/CF-Epoxy resin/PET | 70 | 10/2 | 1.5/0.8 | 2.100–2.200 | 9–16 |

Note
[1] CF: Carbon fiber
PET: Biaxially stretched polyester film
[2] The heat-shrinking rate is measured after a sample of 100 mm square is hung in a circulating drier at 150° C. for one hour. The heat-shrinking rate is correlated with the degree of stretching applied to the film. Therefore, the larger heat-shrinking rate indicates that the larger degree of stretching has been applied to the film.
[3] Measured as to the direction of arranging fibers according to ASTM D1004-61.
[4] $\bar{x}/R$
$\bar{x}$: Average thickness
R: (Maximum thickness - minimum thickness) (Measured at 10 portions at intervals of 10 mm)

EXAMPLES 6–9

The shading members according to the present invention shown in FIGS. 3–6 were prepared.

To one surface or both surfaces of the biaxially stretched polyester film as used in Example 2 was applied a polyester resin as an undercoat agent 12, and then an aluminum vapor-deposited film 13 of 0.4–0.7 μm thick was formed thereon. Further, to one side of the aluminum vapor-deposited surfaces was applied a polyester type heat resistant black ink 14 for gravure 14 by #12 bar coater and dried to make the total thickness 18–19 μm. The resulting sheet was laminated on one surface or both surfaces of substrate layer 10 in the same manner as in Examples 1–5. The resulting shading member was cut in the direction of fiber and in the direction perpendicular thereto into pieces of 10 mm wide and 50 mm long, and was evaluated with respect to shutter curtain characteristics. The results are shown in Table 2. In addition, comparison examples are cases where electrodeposition was effected on aluminum and titanium only was used as a metal sheet. FIGS. 3–6 correspond to Examples 6–9, respectively.

14 denotes an ink of good heat resistance and environmental resistance for imparting shading function, sliding property, water repellent property, reflection prevention and good appearance, for example, a black ink layer composed of a heat resistant polyester resin containing carbon black and additives for imparting the above-mentioned functions.

It is clear from Table 2 that the composite plastic shading member of the present invention is very useful as a shading material of light weight and high strength for high speed shutters.

Table 3 shows the results of measuring flatness (or warp) concerning Examples 3, 7 and 9. The results indicate that the aluminum vapor-deposited film 13 serves to give a better flatness than the member which has only the biaxially stretched polyester film.

In the measurment of flatness, the flatness after post-curing was also measured.

TABLE 2

|  | Construction of laminate sheet | Total thickness ($\mu$m) | Total*[2] weight (mg) | Apparent density (g/cm$^3$) | Rigidity length/ width (g) | Output of shading light receiving element (V) |
|---|---|---|---|---|---|---|
| Example 6 | *[1](A)/CF-Epoxy resin/PET | 78 | 58 | 1.487 | 1.0/0.1 | 2.34 |
| Example 7 | (A)/CF-Epoxy resin/(A) | 96 | 65 | 1.354 | 1.1/0.1 | 2.34 |
| Example 8 | (A)/CF-Epoxy resin/(B)*[1] | 97 | 67 | 1.381 | 1.1/0.1 | 2.34 |
| Example 9 | (B)/CF-Epoxy resin/(B) | 98 | 69 | 1.408 | 1.1/0.1 | 2.34 |
| Comparison Example 2 | Aluminum/Electro-deposition coating (5$\mu$) (Aluminum:super duralumin 2024) | 55 | 82 | 2.982 | 0.4 | 2.34 |
| Comparison Example 3 | Aluminum/chemical nickel plating/Electrodeposition coating (5$\mu$) | 65 | 105 | 3.231 | 0.9 | 2.34 |
| Comparison Example 4 | Titanium, alone | 40 | 90 | 4.500 | 0.5 | 2.34 |
| Comparison Example 5 | Titanium, alone | 60 | 135 | 4.500 | 1.1 | 2.34 |

TABLE 3

|  | Total thickness ($\mu$m) | Number of aluminum vapor-deposited surface | Flatness (Immediately after lamination) | Flatness*[1] (after post-curing) |
|---|---|---|---|---|
| Example 3 | 72 | 0 | 0.300~0.500 | 0.100~0.200 |
| Example 7 | 96 | 2 | 0.05~0.10 | 0.03~0.05 |
| Example 9 | 98 | 4 | 0.05~0.10 | 0.03~0.05 |

Note:
*[1] Post-curing was effected by inserting the shading member of the present invention between a pair of aluminum plates having roughness of not more than 0.005, degree of parallelism of not more than 0.005, of 10 mm thick and 150 mm square, and placing in a circulating drier at 120° C. for 3 hours.

EXAMPLE 10

Figure 9:
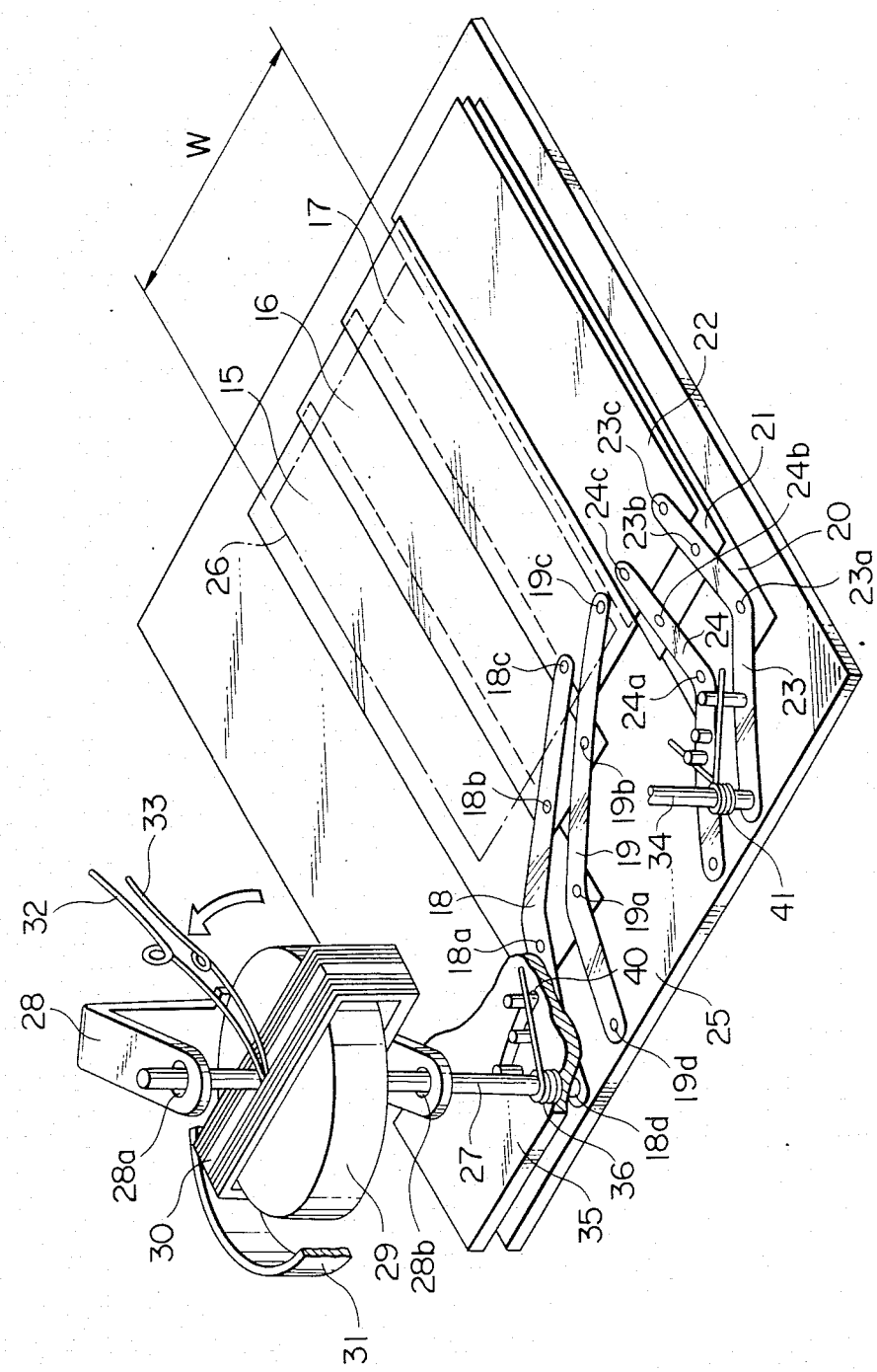
FIG. 9 is an oblique view of an example of an electromagnetic driving shutter.

FIG. 9 is an oblique view of an electromagnetic driving focal plane shutter where the curtain member as mentioned in Example 9 is used. 15, 16 and 17 denote leading curtains of shutter, 18 and 19 are arms for driving leading curtains of shutter, are composed of a light weight metal or plastics, and are rotatably connected with the shutter curtains by shafts 18a, 18b, 18c and 19a, 19b, 19c. The connecting portions are formed such that emboss processing is made around holes in which shafts 18a and 19a of curtain 15 are inserted. Arms 18 and 19 are fitted to a shutter base plate 25 at 18d and 19d. 20, 21 and 22 are trailing curtains of shutter, 23 and 24 are arms for driving trailing curtains, and these are constructed in a manner similar to the leading curtain construction. 25 is a base plate supporting the shutter curtain construction and is provided with an opening portion 26 for exposure. FIG. 9 shows the state where the shutter is charged. 27 is a fixed support member for a driving source. 29 is a permanent magnet constituting a fixing member together with a yoke 31, and is a rare earth element magnet magnetized in the direction of the diameter. 30 is a movable coil constituting a rotating member and is fixed to the output shaft 27, and a driving electric current is flowed thereto from terminals 32 and 33 to rotate the coil in the direction of the arrow.

An electromagnetic driving source for driving the trailing curtains is not shown in FIG. 9, but has a structure similar to the above-mentioned driving source for the leading curtains, and the output shaft 34 is rotated to open or close the trailing curtains. 35 is a base plate for the electromagnetic driving source. 36 and 41 are springs for maintaining the end points of movement of leading curtains and trailing curtains. Since these portions do not directly relate to the present invention, their explanation is omitted.

The curtain materials of Example 7, Example 9 of the present invention and Comparison Example 5 were fixed to the above-mentioned shutter unit to measure the moving speed. The results are shown in Table 4. The measurement was effected such that the shutter curtains of the shutter unit were moved under the same conditions and the time required to pass the short side W (24 mm) of the exposure opening for 35 mm size, that is, the time necessary for crossing the picture (ms) was measured. The shorter the time, the better the performance of shutter at a high speed.

TABLE 4

|  | Time necessary for crossing the picture (ms) |
|---|---|
| Example 7 | 2.8 |
| Example 9 | 2.6 |
| Comparison | 7.2 |

TABLE 4-continued

| | Time necessary for crossing the picture (ms) |
|---|---|
| Example 5 | 5 |

Table 4 shows that the crossing time is less than about ½ of that of conventional titanium curtain material, and it is clear that the composite plastic shading member exhibits a high speed moving performance as shutter curtains.

EXAMPLES 11 AND 12

In the examples, carbon fiber in the carbon fiber-/epoxy resin of Example 9 was replaced by an aromatic polyamide fiber of a lighter weight (KEVLAR 49, tradename, produced by Du Pont; specific modulus of elasticity, $9 \times 10^8$ cm, density, 1.45 g/cm$^3$).

In Example 11 were used aromatic polyamide fibers while in Example 12 were used hybrid fibers composed of the above-mentioned carbon fibers and the aromatic polyamide fibers (50/50). The results are shown in Table 5.

The diameter of the monofilament of the aromatic polyamide is as large as 11.9 μm, but it can be said from Table 5 that the resulting member can be sufficiently practically used as a light weight shutter curtain.

For the purpose of enhancing the reinforcing effect, ceramic whisker of silcon carbide, silicon nitride or the like may be added to the matrix resin for the fibers arranged in one direction. This is also one modification of the present invention.

TABLE 5

| | Construction of laminate sheet | Total thickness (μm) | Total weight (mg) | Apparent density (g/cm$^3$) | Rigidity length/width (g) | Output of shading light receiving element (V) |
|---|---|---|---|---|---|---|
| Example 11 | (B)/E$_1$*$^1$/(B) | 115 | 62 | 1.078 | 0.7/0.1 | 2.34 |
| Example 12 | (B)/E$_2$*$^2$/(B) | 105 | 65 | 1.250 | 0.9/0.1 | 2.34 |

Note.
*$^1$E$_1$: Aromatic polyamide fiber-epoxy resin
*$^2$E$_2$: Hybrid fiber-epoxy resin
Construction of hybrid : Carbon fiber/Aromatic polyamide fiber = 50/50(volume ratio)
(B) is as defined in Table 2.

What is claimed is:

1. A plate-shaped composite plastic shading member having a thickness of 40-150 μm and comprising a substrate layer comprising continuous fiber tows arranged in one direction reinforced by impregnating with a matrix resin solution which is subsequently cured, and a heat-shrinking biaxially-stretched plastic film overlying at least one surface of the substrate layer, the direction in which the greatest rate of the heat-shrinking of said plastic film occurs is set to be perpendicular to the direction in which the fibers in the substrate are arranged.

2. The composite plastic shading member according to claim 1 wherein the continuous fiber tows are composed of inorganic fibers.

3. The composite plastic shading member according to claim 2 wherein the inorganic fibers are carbon fibers.

4. The composite plastic shading member according to claim 1 wherein the continuous fiber tows are composed of organic polymer fibers.

5. The composite plastic shading member according to claim 4 wherein the organic polymer fibers are aromatic polyamide fibers.

6. The composite plastic shading member according to claim 1 wherein the continuous fiber tows are composed of inorganic fibers in combination with organic polymer fibers.

7. The composite plastic shading member according to claim 6 wherein the inorganic fibers are carbon fibers and the organic polymer fibers are are aromatic polyamide fibers.

8. The composite plastic shading member according to claim 1 wherein the heat-shrinking plastic film is a plastic film having at least one surface coated with a black ink.

9. The composite plastic shading member according to claim 1 wherein the heat-shrinking plastic film is a plastic film having at least one surface coated with metal thin film.

10. The composite plastic shading member according to claim 9 wherein the metal thin film is further coated with a black ink.

11. The composite plastic shading member according to claim 9 wherein the metal thin film is applied to the surface of the plastic film by corona discharging treatment, flame treatment, or chemical treatment.

12. The composite plastic shading member according to claim 9 wherein the surface of the plastic film is coated with an undercoating agent and then with a metal thin film.

13. The composite plastic shading member according to claim 1 wherein the content of the matrix resin in the substrate layer is 10-90% by weight.

14. The composite plastic shading member according to claim 13 wherein the content of the matrix resin is 30-50% by weight.

15. A shutter curtain of a camera comprising the composite plastic shading member of claim 1.

16. The shutter curtain of a camera according to claim 15 wherein the thickness of the composite plastic shading member is 40-100 μm.

* * * * *